(12) United States Patent
Spallek et al.

(10) Patent No.: US 10,098,814 B2
(45) Date of Patent: Oct. 16, 2018

(54) SEALING ARRANGEMENT AND CONTAINER ASSOCIATED WITH SAME

(71) Applicant: Kocher-Plastik Maschinenbau GmbH, Sulzbach-Laufen (DE)

(72) Inventors: Michael Spallek, Ingelheim (DE); Karl Köppel, Rainau (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 0 days.

(21) Appl. No.: 14/438,896

(22) PCT Filed: Sep. 11, 2013

(86) PCT No.: PCT/EP2013/002730
§ 371 (c)(1),
(2) Date: Apr. 28, 2015

(87) PCT Pub. No.: WO2014/067597
PCT Pub. Date: May 8, 2014

(65) Prior Publication Data
US 2015/0305977 A1    Oct. 29, 2015

(30) Foreign Application Priority Data

Oct. 31, 2012 (DE) .......................... 10 2012 021 525

(51) Int. Cl.
*A61J 1/05* (2006.01)
*A61J 1/06* (2006.01)
(Continued)

(52) U.S. Cl.
CPC ........... *A61J 1/1431* (2015.05); *A61J 1/1406* (2013.01); *A61J 1/1475* (2013.01); *B65B 51/10* (2013.01);
(Continued)

(58) Field of Classification Search
CPC ...... A61J 1/05; A61J 1/06; A61J 1/062; A61J 1/1406; A61J 1/1431; B65D 1/09; B65D 1/095; B65D 51/002
USPC .................................................. 215/247, 249
See application file for complete search history.

(56) References Cited

U.S. PATENT DOCUMENTS 3,805,986 A * 4/1974 Gaudin ................... B29C 70/74
                                                   215/200
4,307,766 A * 12/1981 Tanokura ............. B65D 51/002
                                                   215/247
(Continued)

FOREIGN PATENT DOCUMENTS

DE      2 327 553      12/1974
DE      2 844 206 C2    4/1980
(Continued)

*Primary Examiner* — Andrew T Kirsch
(74) *Attorney, Agent, or Firm* — Wenderoth, Lind & Ponack, L.L.P.

(57) ABSTRACT

A sealing arrangement is for a container (1) and/or container part, such as a closure cap placed onto the container (1). The interior of the container (1) is used to accommodate a medium, particularly a fluid bottled in a sterile manner, which can be removed from the container (1) by a removal device such as a syringe needle. The removal device penetrates sealing material (9) connected to the container. The sealing material (9) is fixedly connected to the outside (7) of the container (1) and/or container parts facing the environment by a fused and/or adhesively bonded connection.

29 Claims, 10 Drawing Sheets

(51) Int. Cl.
*A61J 1/14* (2006.01)
*B65D 1/09* (2006.01)
*B65D 51/00* (2006.01)
*B65B 51/10* (2006.01)
*B65B 55/06* (2006.01)
*C08F 110/02* (2006.01)

(52) U.S. Cl.
CPC .............. *B65B 55/06* (2013.01); *B65D 1/095* (2013.01); *B65D 51/002* (2013.01); *C08F 110/02* (2013.01)

(56) References Cited

U.S. PATENT DOCUMENTS

| | | | |
|---|---|---|---|
| 4,657,152 A * | 4/1987 | Carveth | A61J 1/1406 215/249 |
| 5,395,365 A * | 3/1995 | Weiler | A61J 1/1406 128/DIG. 24 |
| 5,467,878 A | 11/1995 | Derksen | |
| 5,656,112 A * | 8/1997 | Kuroda | A61J 1/1406 156/322 |
| 5,897,008 A | 4/1999 | Hansen | |
| 6,681,475 B2 | 1/2004 | Thibault et al. | |
| 2008/0131842 A1 * | 6/2008 | Edwards | A46B 5/02 433/215 |

FOREIGN PATENT DOCUMENTS

| | | |
|---|---|---|
| DE | 31 49 780 A1 | 6/1983 |
| DE | 93 17 644 U1 | 3/1994 |
| DE | 43 09 738 C1 | 10/1994 |
| DE | 196 20 169 A1 | 11/1997 |
| EP | 0 364 783 A1 | 4/1990 |
| EP | 0 518 191 A2 | 12/1992 |
| EP | 0 721 897 A1 | 7/1996 |
| EP | 0 763 476 A1 | 3/1997 |
| EP | 2 269 558 A1 | 1/2011 |
| GB | 1 266 302 | 3/1972 |

* cited by examiner

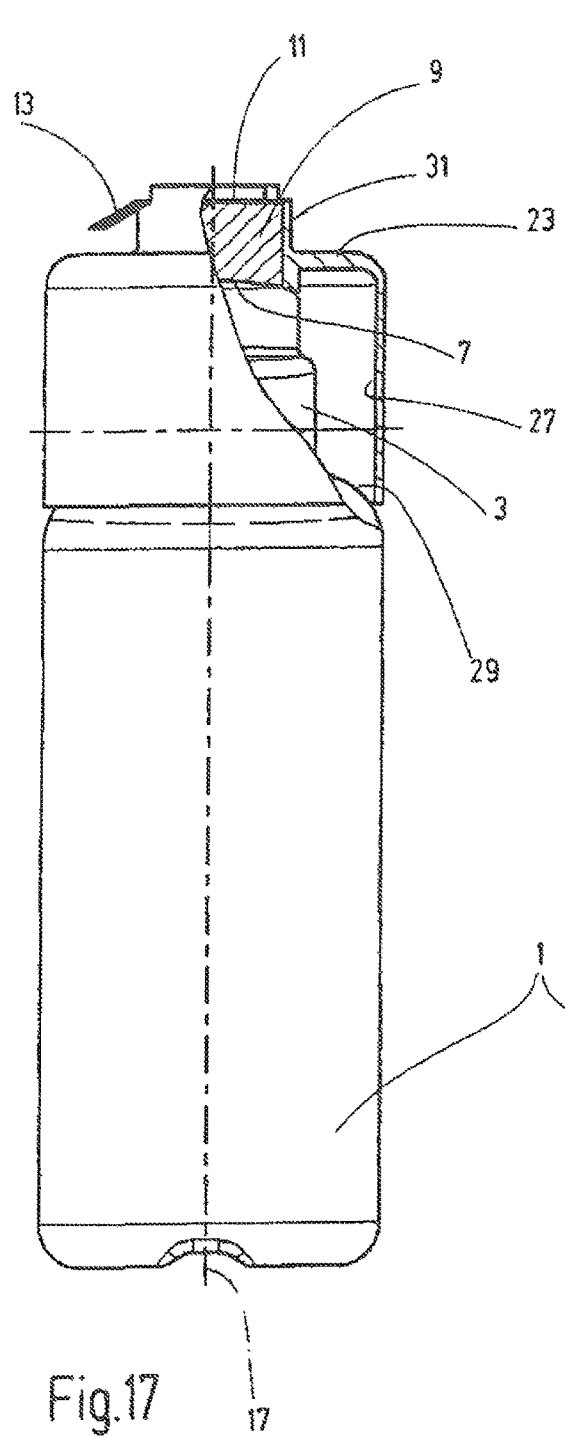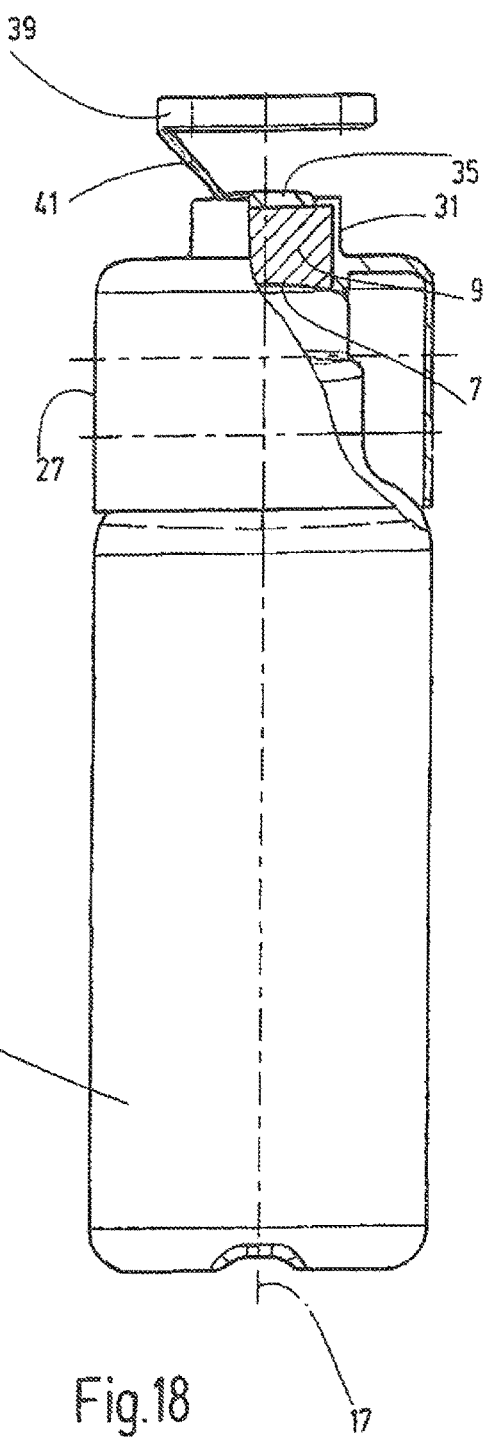

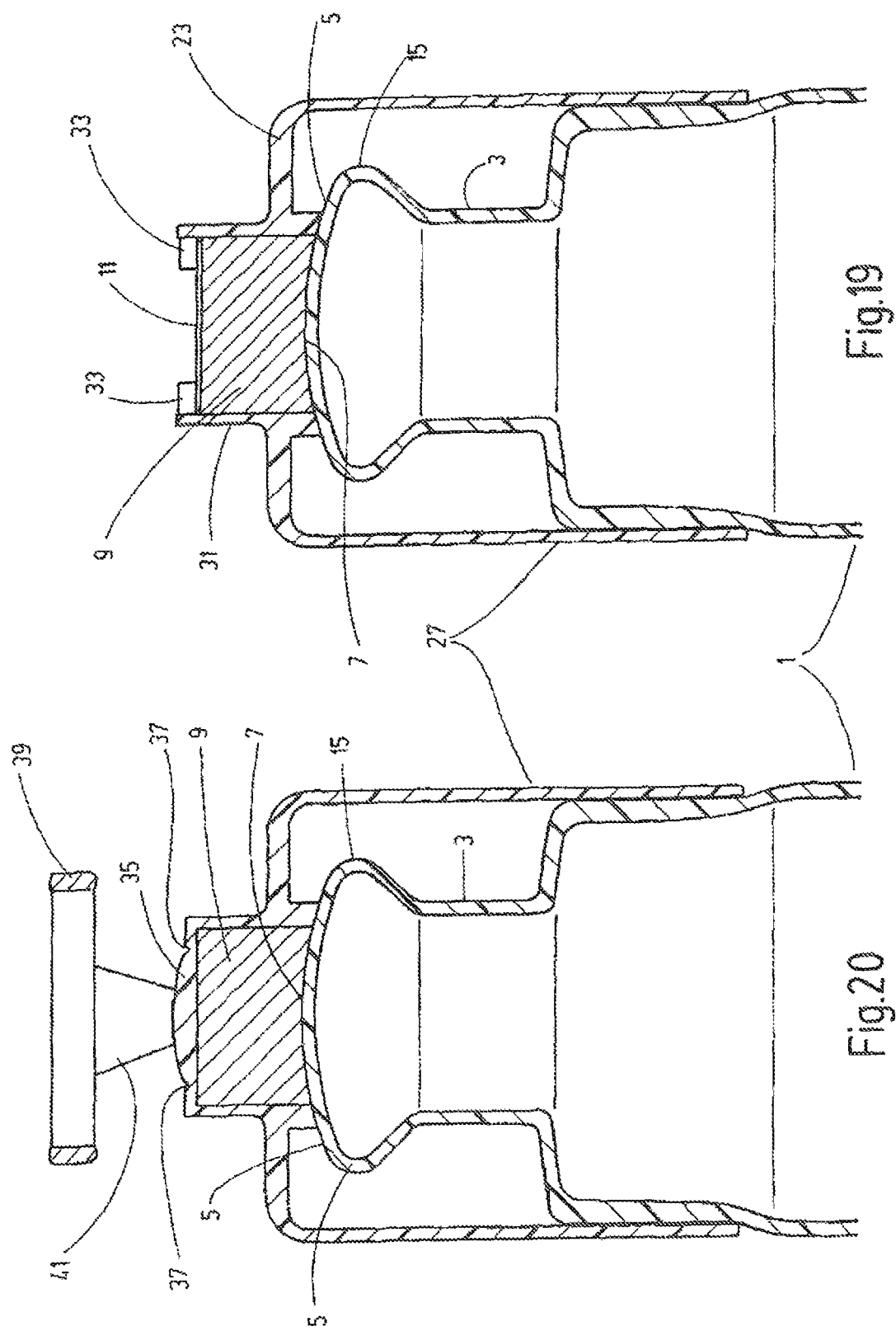

SEALING ARRANGEMENT AND CONTAINER ASSOCIATED WITH SAME

FIELD OF THE INVENTION

The invention relates to a sealing arrangement comprising at least one container and/or at least one container part, such as a closure cap that is placed on the container. The inside of the container is used to accommodate a medium, in particular in the form of a fluid that is bottled in a sterile manner, which medium can be removed from the container by a removal device such as a syringe needle. The removal device penetrates at least one sealing material, which sealing material is connected to the container and/or parts thereof. The invention also relates to a container to which such a sealing arrangement is allocated.

BACKGROUND OF THE INVENTION

Containers in particular, can contain a fluid bottled in a sterile manner. The fluid can be removed from the container by a cannula, for example a syringe needle or a mandrel, as widely used, particularly for medical applications, for example in the form of ampules or infusion bottles. In the case of medical applications, such containers, which are made out of plastic using the blow-fill-seal method or the known Bottelpack® method, are especially suitable because the product is only in contact with a polymer. These containers therefore offer a high degree of protection against microbial contamination, even during long periods of storage under unfavorable environmental conditions. Plastic products of this kind have been disclosed, for example, in U.S. Pat. No. 5,897,008 A or EP 2 269 558 A1. When the product is to be removed by an insertable cannula or an insertable mandrel, such containers are only suitable for a single use, since resealing the containers is not possible after an initial opening thereof, because the polyolefins used in such BFS containers are not nearly elastic enough to reliably seal the puncture site. To remedy this problem, insertion parts or stoppers made out of rubber are known to be used in BFS containers that are intended for medical purposes. As a result, on the one hand, the manufacturing process is made substantially more costly and is slowed by this insertion. In addition, sterilizing the rubber parts is necessary before inserting them to maintain low bacterial levels in the product. A serious disadvantage is the fact that the product is in contact with the insertion part, even during the storage period. U.S. Pat. No. 5,467,878 A, EP 0 721 897 A1, DE 2 844 206 C2 and DE 2 327 553 A1 disclose containers having caps, which have a rubber insert. The caps are pressed onto the container head and are fixedly connected to the neck of the bottle by a mechanical fixation. Since the rubber insert is pressed onto the flexible, thin container wall only by mechanical structure, a gap always remains as a result of the design. Unwanted microbiological contamination, bacterial growth, fungus, etc. may easily arise in this gap or space. This contamination can easily find its way into the container when the container head is pierced. In addition, fluid can be easily drawn in a suction process as a result of capillary action, and thus, may find its way into the space between the insert and the container head.

To avoid the problems associated with rubber inserts, a container of the above mentioned generic type is already known from EPO 364 783 A1, in which, rather than a rubber material, a sealing material made out of a thermoplastic elastomer (TPE) is fixedly applied to a cap. That sealing material can be applied to the container head in such a way that the sealing material of the cap fits snuggly along the wall region of the container and is provided as a puncture site. A cavity or gap then cannot be avoided reliably between the container head and the sealing material, and fluid may possibly be drawn in a suction process as a result of a capillary action created by a thin gap. To ensure the sterility of the contact surface of the container head and sealing material, an autoclave process is also necessary, to which the contents of the container are also subjected. As a result, such container systems are only suitable for thermally stable products that can withstand the high temperatures (ca. 115° C. to 132° C.) of an autoclave process.

SUMMARY OF THE INVENTION

An object of the invention is to provide an improved sealing arrangement, which offers increased protection, as compared to the prior art, against microbial loads that could affect sterility.

This object is basically achieved according to the invention by a sealing arrangement having a welded or bonded connection of the seal to the outside of the container or of a container part, such as a cap. The risk is then avoided that a gap will form on the contact surface of the sealing material, as is the case in the corresponding solution in the prior art, in which the sealing material is pressed snuggly against the assigned contact surface by a contact pressure. Contamination can then be avoided as a result of bacterial migration due to capillary action along a gap.

The respective sealing material is preferably fixedly welded to the outer wall of the container without filler material and preferably free of adhesives.

In particular, the configuration may be advantageously such, that the respective sealing material rests directly on the outer wall, to which it can be assigned, with no spacing, and with the entire contact surface of the sealing material that faces the container or container part resting against the outer wall, to which it can be assigned.

In an especially advantageous manner, elastomers or plastics that can be bonded or welded may be used, wherein a thermoplastic elastomer (TPE) is preferably used as a sealing material.

In the case of containers that are produced by a blow, fill and seal method, the sealing material is preferably applied to the container after the production of said container has been completed.

The subject matter of the invention is also a container made out of plastic with the sealing assembly of the invention on the outside of the container or on a part thereof facing the environment. The sealing material is fixedly connected to the outside of the container and/or to parts thereof facing the environment by a welded and/or adhesively bonded connection.

In a particularly advantageous manner in the case of the invention, a sealing material in the form of a disk-like body is connected to the outside of the container wall in a materially integrated bond, the inside of which is adjacent to a sealed container to receive the respective product that is to be bottled in a sterile manner. In the case of a plastic container and a thermoplastic sealing material, particularly advantageous a connection in a materially integrated bond can be created by a thermal joining process, in which the two joining elements are welded at temperatures adjusted according to the softening behavior of the materials, for example at temperatures in the range of 200° C. Both parts are preferably heated and then briefly pressed against one another. Corresponding friction-welded joints can be used to connect the sealing material to the container or to parts thereof. In so doing, particularly advantageously the surfaces of the contact surface made out of thermoplastic sealing material and the container head both can be simultaneously sterilized.

In particularly advantageous, exemplary embodiments, the container has a container head, which is connected to a main part of the container by a neck part. The container head has a wall section, which can be pierced for a removal procedure. The sealing material is provided on the container head.

In a particularly advantageous manner, a protective film may be provided such that it rests detachably on the outside of the sealing arrangement. The protective film, which is to be removed prior to the first penetration, may serve as a seal of quality.

When the wall section of the container head that is connected to the body of the sealing material has a curvature that extends from the interior of the container directed outward, the outside of the body of the sealing material preferably has a similar curvature, so that the body of the sealing material is a continuation of the outer contour of the container head.

Alternatively, the outside of the body of the sealing material may have at least one recess, for example in the form of an annular space. The recess can extend concentrically to a central, non-recessed region. Other contouring of the outside of the body of the laminate material may be provided, for example a trough-like depression in the actual area to be punctured.

In particularly advantageous exemplary embodiments, a plastic ring that laterally encloses the body of the sealing material may be provided. The ring can be connected to the container head and/or to the main part of the container. A plastic ring of this kind can be cast or molded onto the container head and body of the sealing material. A plastic ring of this kind may also have a mechanically fixed connection to the container head, for example, by a catch mechanism, welded joint or riveting.

The plastic ring may engage behind a radially projecting edge region on the container head as a catch mechanism.

In the case of exemplary embodiments, in which a shoulder is formed at the transition between the main part of the container and the container head, the plastic ring can overlap over the container head in the manner of a cap and can be connected to the shoulder.

In particularly advantageous exemplary embodiments, the cap-like plastic ring forms an enclosure for the body of the sealing material in the form of a cylinder, which projects axially outward beyond the body. The cylinder wall of a cylinder of this kind may form a connection region for a removal adapter, such as are known from EP 1 847 242 A1, for example, to provide a mechanism for piercing or opening the container.

In a particularly advantageous manner, the outer end of a cylinder of this kind may also have a cover formed thereon, thereby forming at least one predetermined breaking point, with a tab formed on the cover as an integral part to allow separation of the cover at the respective predetermined breaking point.

The subject matter of the invention is also a sealing material for a sealing arrangement, which material comprises elastomers or plastics that can be bonded or welded. In particular, a thermoplastic elastomer (TPE) is provided. The sealing material may be formed by a block-shaped or disk-shaped body. A block-shaped sealing material of this kind may also be produced separately from the container and be made available for when the container is used, for example, in a form such that a corresponding block is included when packaging the finished and filled container. A user can then apply the block of sealing material, for example, through the use of an adhesive bond with a plastic material. If the block of sealing material can be used by a releasable, adhesively bonded connection to the respective container, a pack of ampules, for example having six container-shaped ampules, can be combined in a package having only one block of sealing material, which may then be placed on the respective ampule over the detachable, adhesively bonded connection for a removal procedure. Then, after the use of this ampule container, the block of sealing material may again be placed on the subsequent ampule for another removal procedure after having been removed from the preceding container.

The subject matter of the invention is also a method for producing a container according to the invention.

In the case of the method according to the invention, when a sealing material is used, which material contains an antimicrobial additive, the outer surface of the sealing material may also be kept in a low-germ state over an extended period. This method provides the additional advantage that the puncture site of the sealing material need not be disinfected prior to the insertion of the mandrel or cannula.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 17 is a side view, partially in section in the region of the container head, of a container according to a ninth exemplary embodiment of the invention;

FIG. 18 is a side view, partially in section in the region of the container head, of a container according to a tenth exemplary embodiment of the invention;

FIG. 19 is a partial side view section of only the head region of the container of a ninth exemplary embodiment shown in FIG. 12, depicted in a larger scale; and FIG. 20 is a partial side view in section of only the head region of the container of the tenth exemplary embodiment from FIG. 18.

DETAILED DESCRIPTION OF THE INVENTION

The invention is explained below on the basis of exemplary embodiments of containers, such as those which can be used as infusion bottles or, having smaller dimensions, as ampules, for example, for the removal of the product by directly inserting an injection cannula. When using an infusion bottle, an insertion mandrel may be provided to remove the product. The containers are produced of a plastic material, which is suitable for the known blow-fill-seal method, for example in accordance with the known Bottelpack® system, thus made out of a polyolefin such as a polyethylene having a lower or higher density, or polypropylene.

Figure 1:
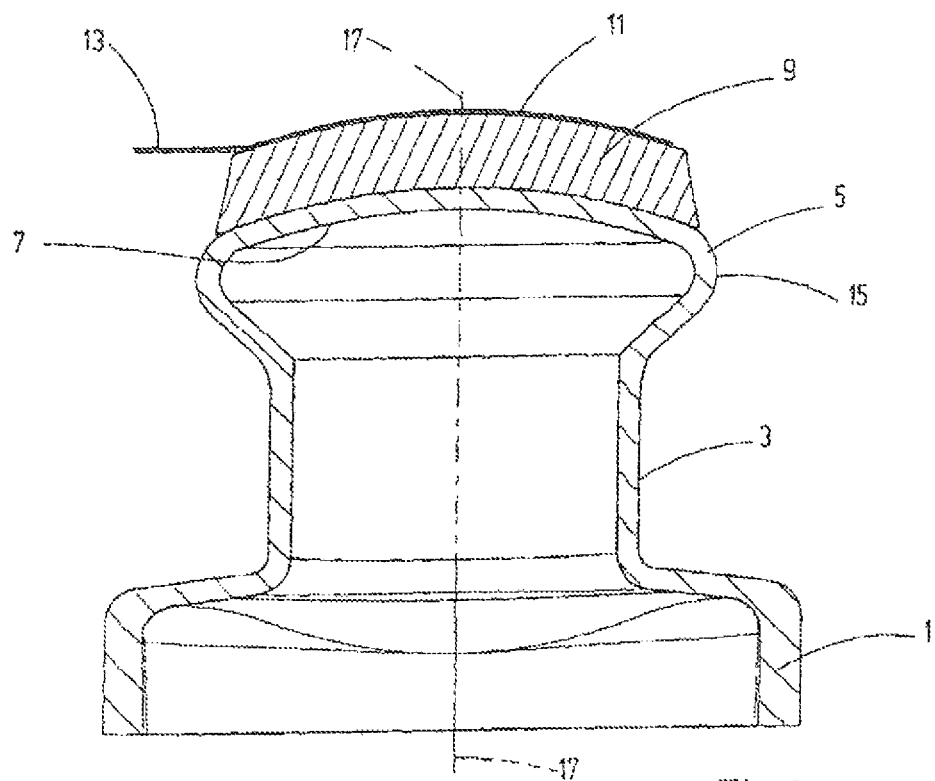
FIG. 1 is a side view in section, drawn in a larger scale as compared to a practical embodiment, depicting only the region adjacent to the container head of a container according to a first exemplary embodiment of the invention.
Figure 2:
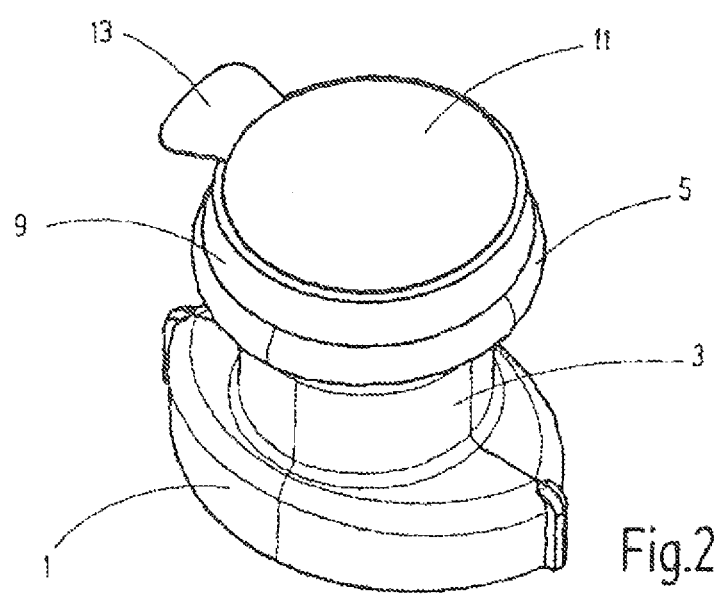
FIG. 2 is a perspective top view in a smaller scale, of the region shown in FIG. 1.

FIGS. 1 and 2 show a first exemplary embodiment, in which the main part of the container 1, of which only the upper end section is shown. A narrowed, circular-cylindrical neck part 3 is connected to the main part of the container, which container has an oval contour in its transverse cross section. The neck part, in turn, transitions into a container head 5, which forms the upper terminal end of the container head 5. The upper side of the container head 5 has a wall region 7 that is curved slightly outward. The wall region is provided as an area to be punctured for the piercing of the container wall during a removal procedure. A sealing material made of a thermoplastic elastomer (TPE) in the form of a disk-shaped body 9 is non-detachably affixed to the wall region 7. This body 9 is made out of a polymer, which has increased elasticity as compared to the container material, so that a puncture site is resealed in the same way as occurs in the case of a sealing element made out of rubber. In the case of the material of the body 9, this may be a polyethylene having a lower or higher density, for example Santoprene® 181-55MED, Laprene® SEBS, Thermolast® TM 3RST, or the like. To form the non-detachable connection of the body 9 to the wall region 7, this wall region and the contact surface of the body 9 are heated to a softening temperature, approximately in the range of 200° C., and are then pressed against one another so that an inseparable connection in a materially integrated bond is created. A protective film 11 made of plastic is detachably applied to the upper surface of the body 9, which protective film can be removed for the initial use of the container by a projecting tab 13. The upper surface of the protective film 11 may be provided with markings, which represent an original seal, for example. As can be seen in FIG. 1, the upper surface of the body 9, which is covered by the protective film 11, is curved in a corresponding manner, like the wall region 7 at the container head 5. In the examples of FIGS. 1 and 2, the disk-shaped body 9 covers almost the entire wall region 7 up to the vicinity of a lateral convexity 15. As a result of that convexity, the diameter of the container head 5 is enlarged as compared to the diameter of the neck part 3.

Figure 3:
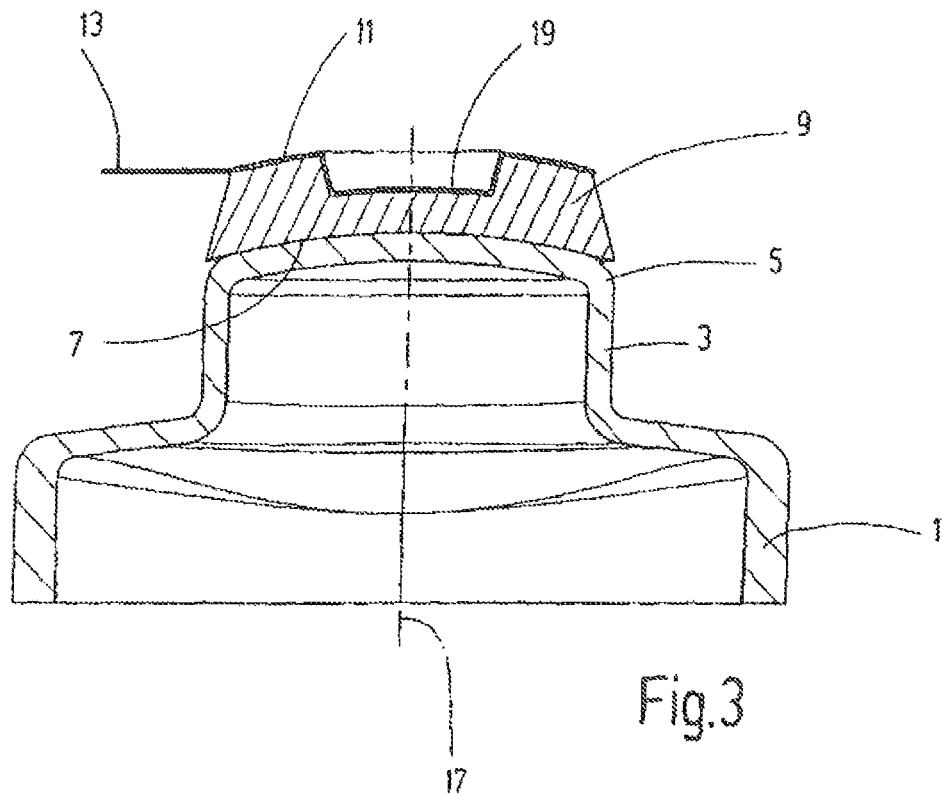
FIGS. 3 and 4 are a side view in section and perspective top view in a smaller scale than the side view, respectively, of only the region adjacent to the container head of a container according to a second exemplary embodiment of the invention.
Figure 4:
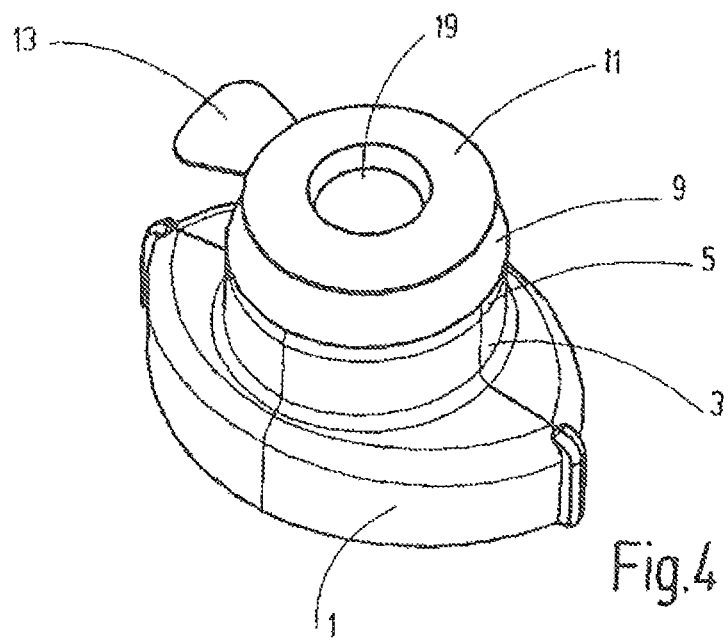

The second exemplary embodiment of FIGS. 3 and 4 differs from the first exemplary embodiment in that the neck part 3 transitions into the container head 5 without a convexity and has the same diameter as the container head. Again, this container head forms an outer curved wall region 7 for the non-detachable connection with the body 9 of the sealing material (TPE). A further difference as compared to the first embodiment is that the body 9 of the sealing material has a depression 19, which is concentric to the principal axis 17. The depression has the form of trough having oblique side walls, which diverge outward. This depression 19 forms an area to be punctured in the body 9, which has a reduced wall strength, while the remaining part of the body 9 extends with no depression to the outer edge of the wall region 7 at the container head 5.

Figure 5:
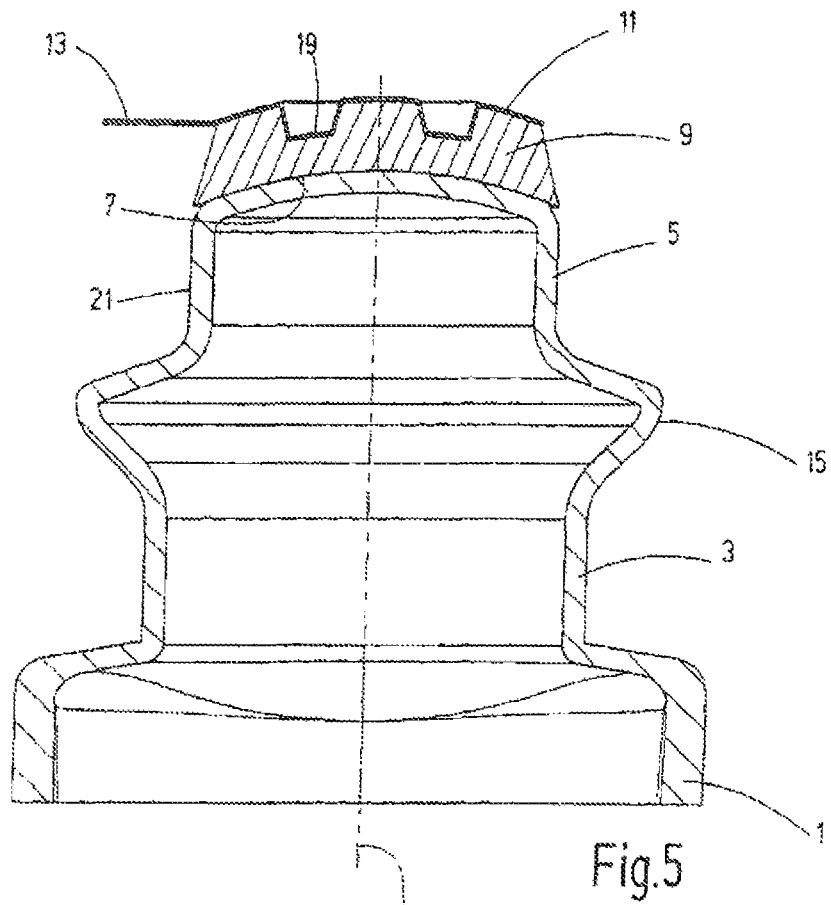
FIGS. 5 and 6 are a side view in section and perspective top view in a smaller scale than the side view, respectively, of only the region adjacent to the container head of a container according to a third exemplary embodiment of the invention.
Figure 6:
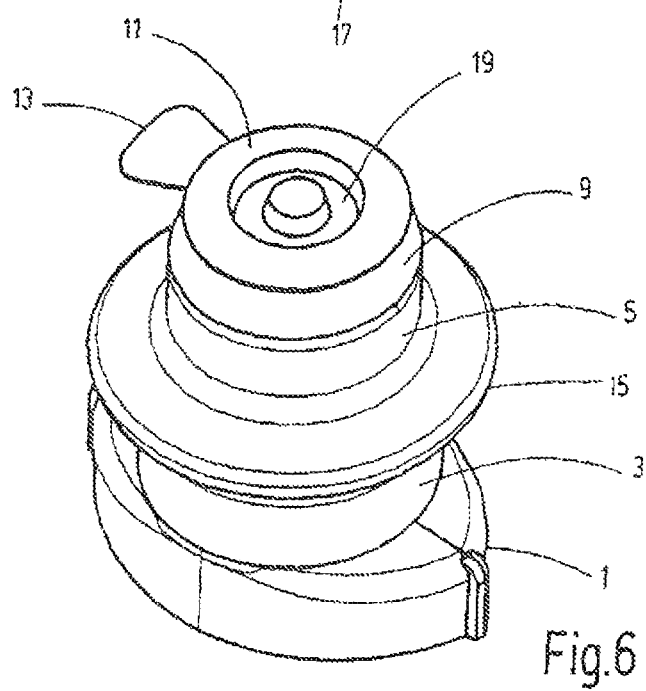

The third exemplary embodiment from FIGS. 5 and 6 differs from the preceding examples in that, starting from the convexity 15, which is connected to the neck part 3, the container head 5 is lengthened by a cylinder part 21 upward to the wall section 7. The body 9 of the sealing material corresponds to the example in FIGS. 3 and 4 in its configuration and contour, with the exception that the depression 19 is designed in the form of an annular space, which is concentric to the axis 17.

Figure 7:
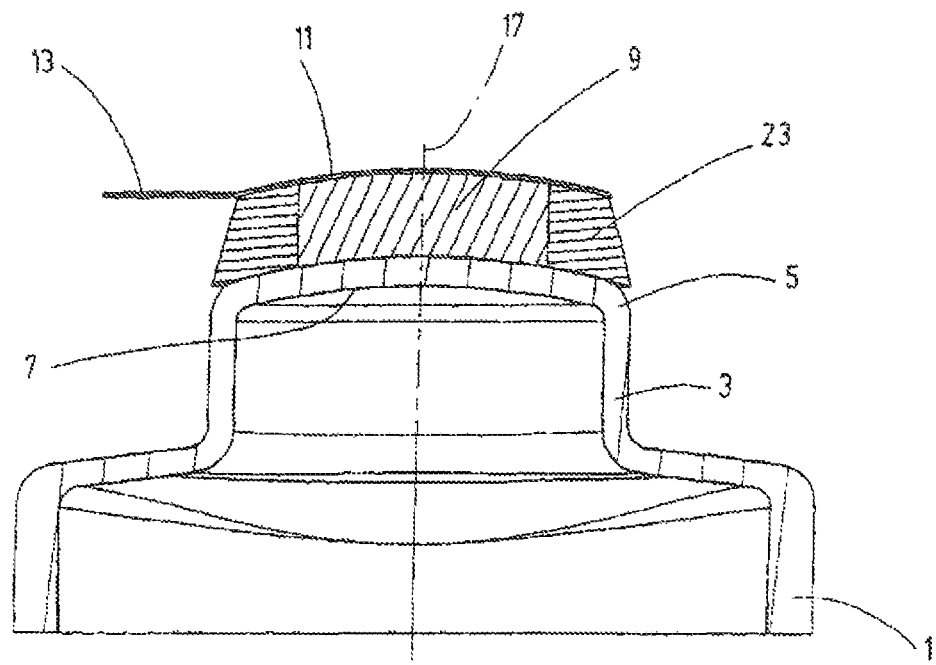
FIG. 7 is a side view in section of only the region adjacent to the container head of a container according to a fourth exemplary embodiment of the invention.
Figure 8:
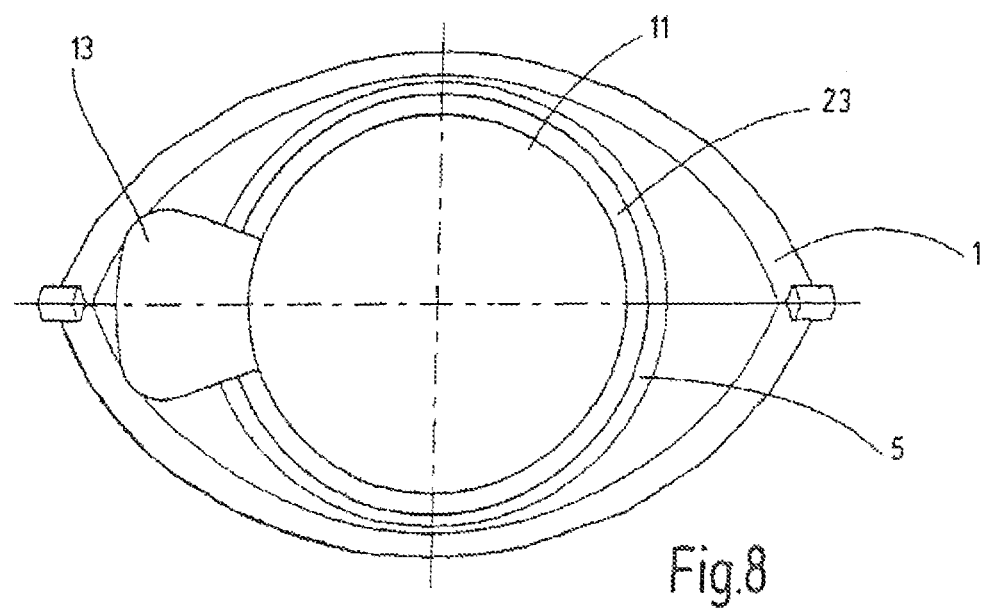
FIG. 8 is a top view of the fourth exemplary embodiment of FIG. 7.

The fourth exemplary embodiment according to FIGS. 7 and 8 corresponds to the exemplary embodiment from FIGS. 3 and 4 in terms of the design of the neck part 3 and of the container head 5. The difference as compared thereto is that the body 9 of the sealing material has a smaller diameter than the associated wall region 7 at the container head 5, without a depression being formed in body 9. The body 9 is encompassed by a plastic ring 23 in the region between the outside of the body 9 and the outer edge of the wall region 7. The enclosure of the body 9 facilitates handling during the manufacturing process. The plastic ring 23 may be bonded or welded to the body 9. In producing a connection of the body 9 to the wall region 7 at the container head 5 in a materially integrated bond, the plastic ring 23 may, in turn, form a welded connection at the container head 5.

Figure 9:
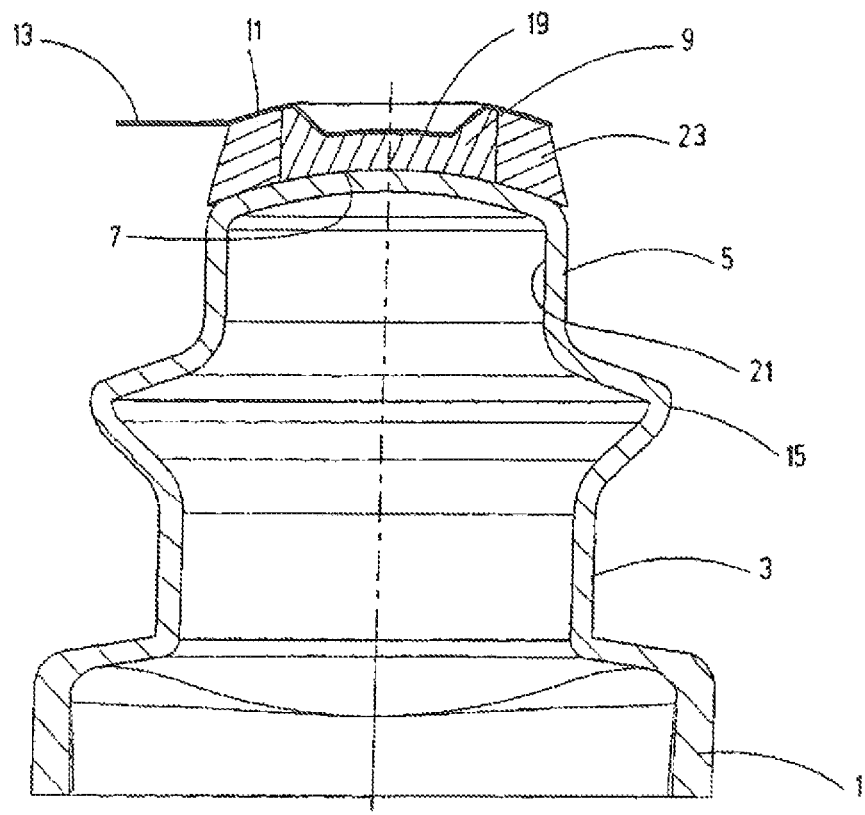
FIGS. 9 and 10 are a side view in section and perspective top view in a smaller scale than the side view, respectively, of only the region adjacent to the container head of a container according to a fifth exemplary embodiment of the invention.
Figure 10:
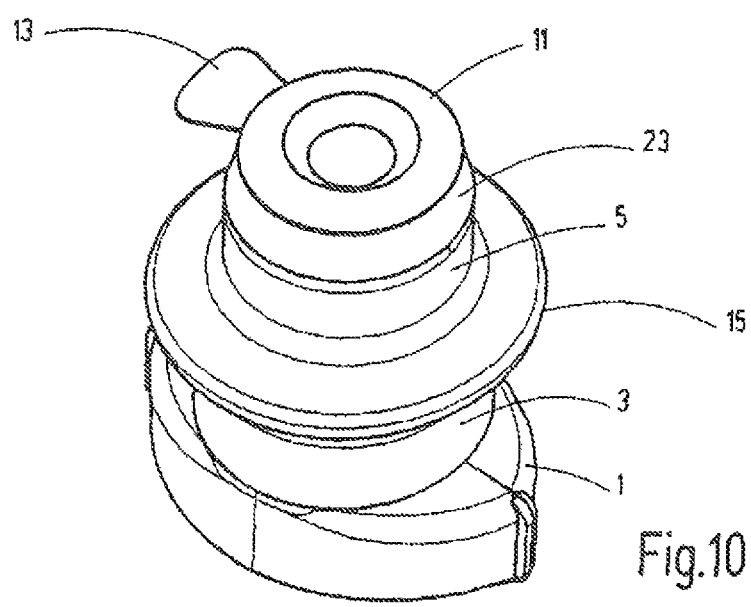

FIGS. 9 and 10 show a fifth exemplary embodiment, in which the design of the neck part 3, convexity 15 and container head 5 corresponds to the embodiment in FIGS. 5 and 6. As in the example in FIGS. 7 and 8, however, the body 9 of the sealing material is encompassed by a plastic ring 23, as is the case with the example in FIGS. 7 and 8. A depression 19 is formed on the upper surface of the body 9 in a form that is similar to the depression 19 from FIG. 3, wherein, in FIG. 9, the recess is open, up to the vicinity of the outer edge of the body 9.

Figure 11:
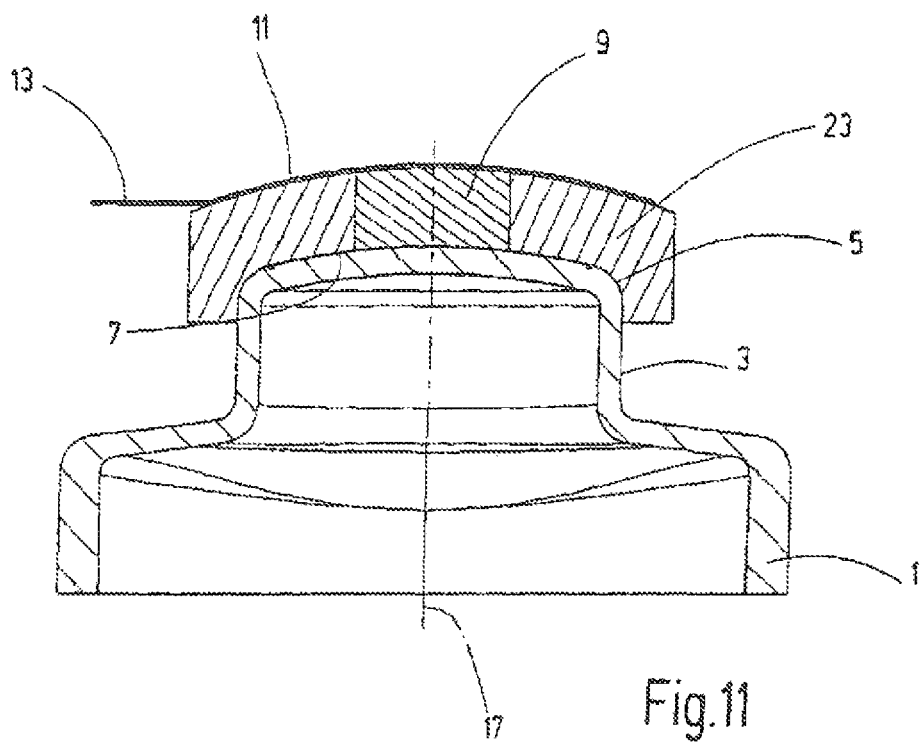
FIGS. 11 and 12 are a side view in section and perspective top view in a smaller scale than the side view, respectively, of only the region adjacent to the container head of a container according to a sixth exemplary embodiment of the invention.
Figure 12:
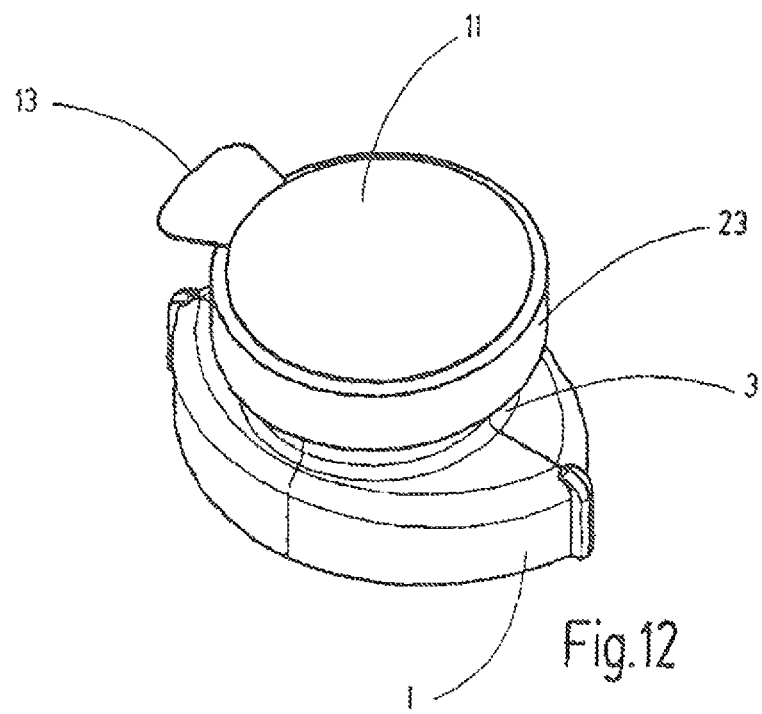

FIGS. 11 and 12 show a sixth exemplary embodiment, in which the design of the neck part 3 and of the container head 5 corresponds to the embodiment in FIGS. 3 and 4. The body 9 of the sealing material has a diameter that is reduced as compared to the wall region 7 at the container head 5. Accordingly, the inner diameter of the plastic ring 23, which is provided as an enclosure, is reduced accordingly. The outer diameter of the plastic ring 23 is enlarged in such a way that the ring extends over the edge of the wall region 7 and projects beyond the container head 5. In this way, an additional, lateral anchoring of the plastic ring 23 is implemented.

Figure 13:
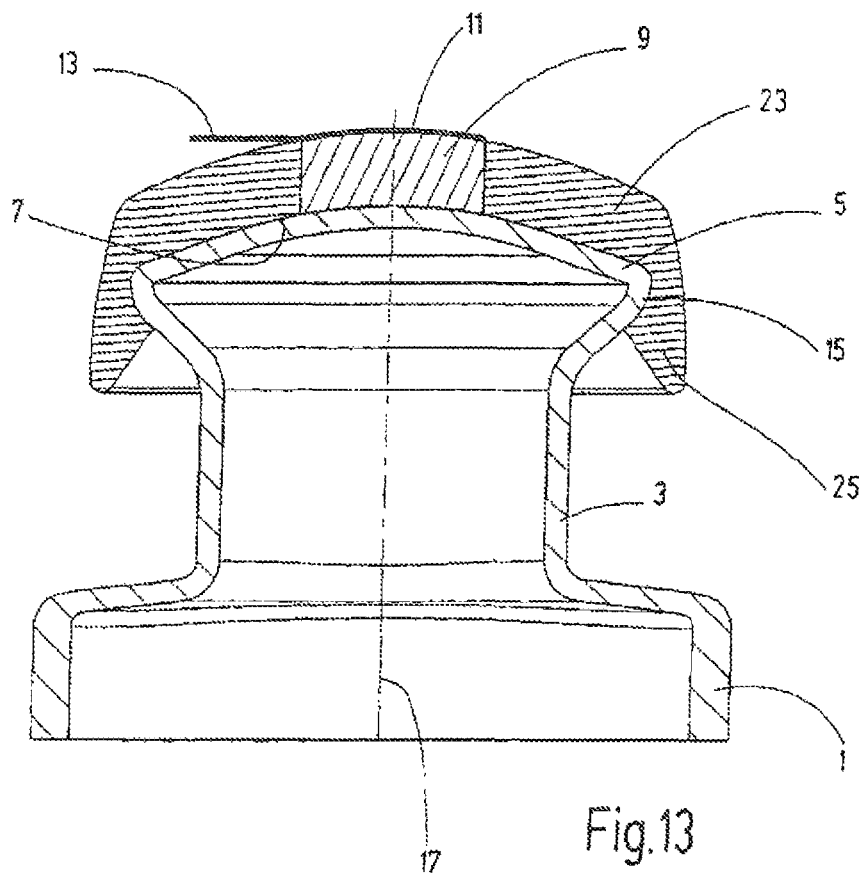
FIGS. 13 and 14 are a side view in section and perspective top view in a smaller scale than the side view, respectively, of only the region adjacent to the container head of a container according to a seventh exemplary embodiment of the invention.
Figure 14:
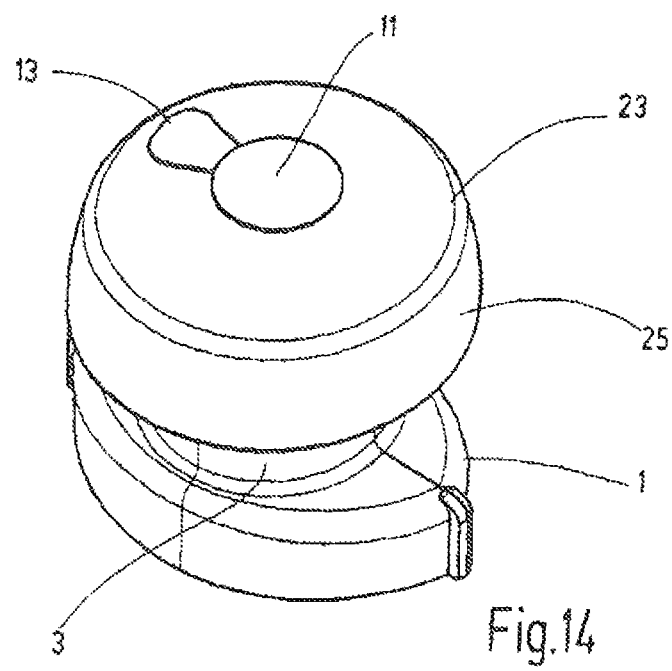

In the case of the seventh exemplary embodiment shown in FIGS. 13 and 14, the neck part 3 is again extended to the convexity 15, to which the container head 5 is directly connected. As in the example in FIGS. 11 and 12, the body 9 of the sealing material has a reduced diameter as compared to the diameter of the container head 5. The encompassing plastic ring 23 is enlarged as compared to FIGS. 11 and 12 to form a kind of cap. The outer edge 25 of ring 23 projects over the convexity 15 at the end of the neck part 3 in such a way that a snapping or locking connection is formed for the plastic ring 23.

Figure 15:
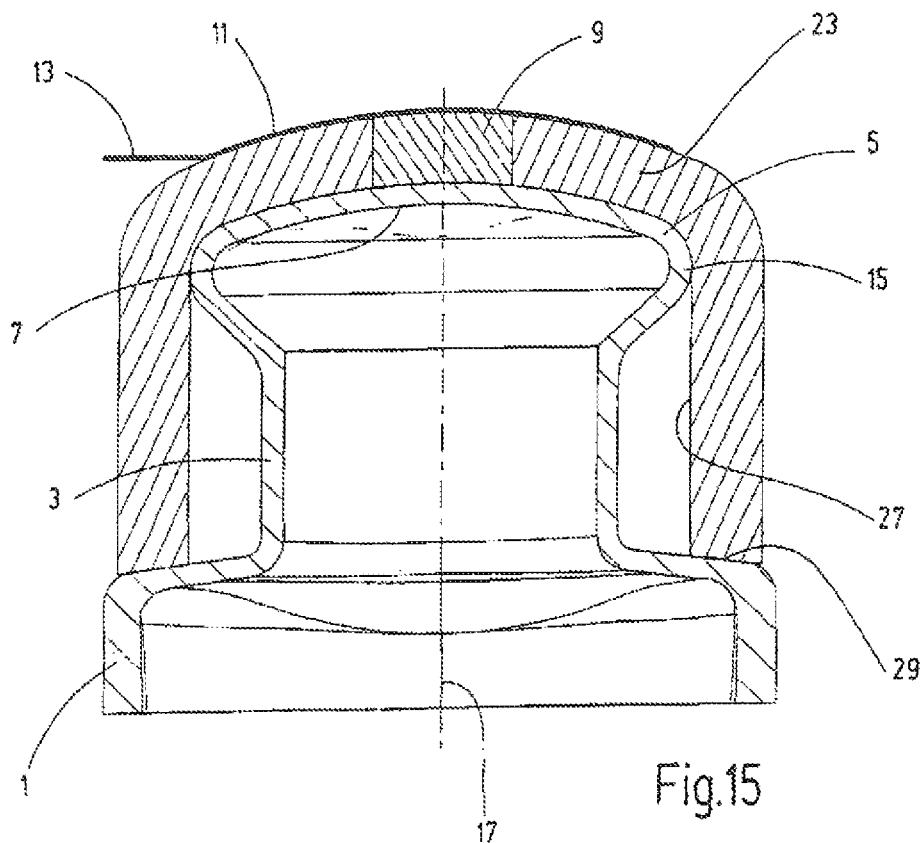
FIGS. 15 and 16 are a side view in section and perspective top view in a smaller scale than the side view, respectively, of only the region adjacent to the container head of a container according to an eighth exemplary embodiment of the invention.
Figure 16:
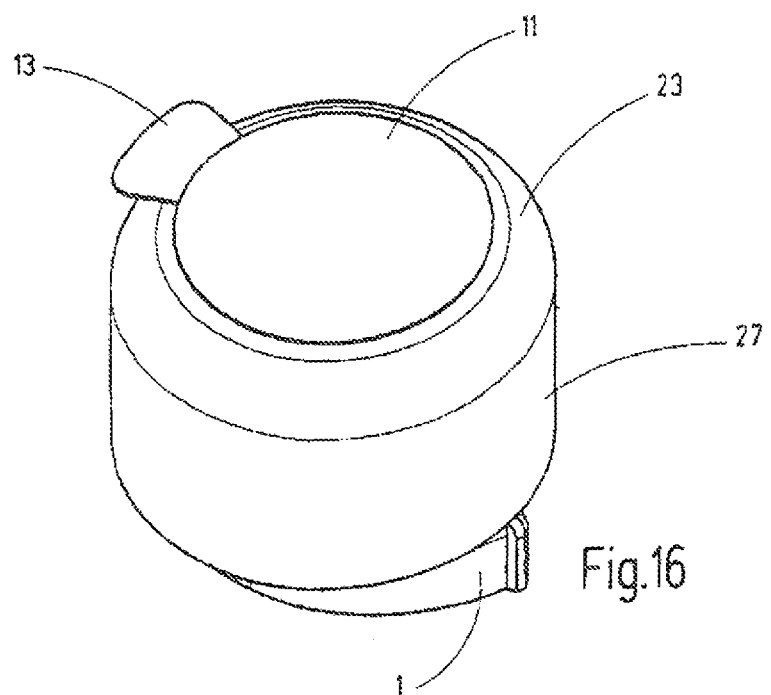

In the case of the exemplary embodiment from FIGS. 15 and 16, the shape of the neck part 3, the convexity 15 and the container head 5 corresponds to the embodiment in FIGS. 13 and 14. The encompassing plastic ring 23 is lengthened using an outer cylinder 27 to form a cap-shaped cover such that the cylinder end rests against a shoulder 29, which is formed at the transition between the main part of the container 1 and the neck part 3. The cylinder end may be affixed to the shoulder 29, for example by adhesive bonding or welding.

FIGS. 17 and 19 show a ninth exemplary embodiment. Like the preceding example in FIGS. 15 and 16, the plastic ring 23 is enlarged in a cap-shaped manner, having an outer cylinder 27, which extends to a shoulder 29 on the main part of the container 1. The neck part 3, convexity 15 and container part 5 correspond to the example in FIGS. 15 and 16. Unlike what is shown there, the plastic ring 23 forms an enclosure for the body 9 of the sealing material in the form of a cylinder 31. Cylinder 31 projects axially upward beyond the body 9 and has projections 33, see FIG. 19, projecting partially over the protective film 11. The projecting wall of the cylinder 31 having the projections 33 may form a receptacle for affixing a known removal adapter.

The tenth exemplary embodiment from FIGS. 18 and 20 differs from the example in FIGS. 17 and 19 in that, instead of the protective film 11 on the upper end of the cylinder 31, a protective cover 35 is formed as an integral part. Predetermined breaking points 37 (FIG. 20) are formed in cover 35 permitting tearing off the cover 35 for a removal procedure. To make tearing off the cover 35 easier, a ring 39, which serves as a handle, is formed above a connection tab 41 on the cover 35.

In order to obtain a low-germ surface, an antimicrobial additive may be added to the sealing material of the body 9 during production, for example With Stand® from Poly One or HP 7A 4000 AM from Gabriel Chemie. This addition has the advantage that the puncture site on the body 9 no longer needs to be disinfected prior to piercing the site by a mandrel or cannula.

While various embodiments have been chosen to illustrate the invention, it will be understood by those skilled in the art that various changes and modifications can be made therein without departing from the scope of the invention as defined in the claims.

The invention claimed is:

1. A container for a liquid for medical use to be withdrawn from the container with a removal device, comprising:
    a container body of plastic and formed and filled with the liquid and sealed in a blow molding-fill-seal process, the liquid being in an interior of said container body, said container body having a plastic closure cap being pierceable with the removal device, said closure cap being joined to said container body and being formed as a separate member from a remaining portion of said container body before being attached to said remaining portion of said container body; and
    a resealing member of resilient material having an entire contact surface thereto at least one of welded or adhesively bonded and fixed directly to an outer surface of said closure cap of said container body with no spacing between said resealing member and said outer surface, said resilient material being a thermoplastic elastomer, said resealing member being pierceable with the removal device and being able to seal closed a puncture site formed in said container body by the removal device and being formed in a final resealing member shape as a separate member from said container body before being attached to said container body.

2. A container according to claim 1 wherein
said resealing member has a disk-shaped body.

3. A container according to claim 1 wherein
said closure cap comprises a container head connected to said container body by a neck part.

4. A container according to claim 1 wherein
a removable protective film is provided on an outer surface of said resealing member, said outer surface of said resealing member being on a side of said resealing member remote from said container body.

5. A container according to claim 1 wherein
said closure cap comprises a wall section connected to said resealing member, said wall section having a convex curvature, said resealing member having an inner surface connected to said wall section with said inner surface having a concave curvature mating with said convex curvature.

6. A container according to claim 1 wherein
a recess is formed in an outer surface of said resealing member, said outer surface of said resealing member being remote from said container body.

7. A container according to claim 6 wherein
said recess comprises an annular space extending concentrically to a central, non-recessed region of said resealing member.

8. A container according to claim 1 wherein
a plastic ring laterally surrounds said resealing member and is connected to said outer surface of said container body.

9. A container according to claim 8 wherein
said plastic ring axially engages a radially extending, back surface of a radially projecting edge region of said container body, said back surface facing in a direction away from said outer surface of said container body.

10. A container according to claim 8 wherein
said closure cap is connected to a container head connected to a remaining portion of said container body by a neck part;
said container body comprises a shoulder at a transition between said container head and said remaining portion of said container body; and
said plastic ring overlaps said container head and forms a cap part connected to said shoulder.

11. A container according to claim 10 wherein
said plastic ring forms a cylindrical enclosure for said resealing member, said cylindrical enclosure projecting axially outward from said resealing member.

12. A container according to claim 1 wherein
said resealing member is at least one of welded or adhesively bonded to only an exposed axial end surface of said container body relative to a longitudinal axis of said container body, leaving lateral sides of said container body exposed.

13. A container according to claim 12 wherein
lateral sides of said resealing member are uncovered and exposed to a surrounding environment.

14. A method of producing a container for a liquid for medical use to be withdrawn from the container with a removal device, comprising the steps of:
providing a container including a container body of plastic and formed; and filled with the liquid in an interior of the container body and sealed in a blow molding-fill-seal process, the container body having a plastic closure cap being pierceable by a removal device, the closure cap being joined to the container body and being formed as a separate member from a remaining portion of the container body before being attached to the remaining portion of said container body;
providing a resealing member of a thermoplastic elastomer, the resealing member being previously formed in a final resealing member shape and formed separately from the container and being able to seal close a puncture site formed in the closure cap by a removal device; and
attaching and fixing an entire contact surface of the resealing member in the final resealing member shape by at least one of welding or adhesively bonding directly to an outer surface of the container body with no spacing between the resealing member and the outer surface.

15. A method according to claim 14 wherein
the resealing member is welded to the outer surface of the container body.

16. A method according to claim 14 wherein
at least one of the container body or the resealing member is heated to a sterilization temperature before being pressed together.

17. A method according to claim 14 wherein
the thermoplastic elastomer contains an antimicrobial additive.

18. A method according to claim 14 wherein
a removable protective film is provided on an outer surface of the resealing member remote from the container body.

19. A method according to claim 14 wherein
a recess is formed in an outer surface of the resealing member, the outer surface of the resealing member being remote from the container body.

20. A method according to claim 14 wherein
a plastic ring laterally surrounds the resealing member and is connected to the outer surface of the container body.

21. A method according to claim 20 wherein
the closure cap is molded with a container head connected to the remaining portion of the container body by a neck part;
the container body is molded with a shoulder at a transition between the container head and the remaining portion of the container body; and
the plastic ring is mounted to overlap the container head and forms a cap part connected to the shoulder.

22. A method according to claim 14 wherein
the resealing member is at least one of welded or adhesively bonded to only an exposed axial end surface of the container body relative to a longitudinal axis of the container body, leaving lateral sides of the container body exposed.

23. A method according to claim 22 wherein
lateral sides of said resealing member are left uncovered and exposed to a surrounding environment.

24. A container for a liquid for medical use to be withdrawn from the container with a removal device, comprising:
a container body of plastic and formed and filled with the liquid and sealed in a blow molding-fill-seal process, the liquid being in an interior of said container body, said container body being pierceable with the removal device;
a resealing member of resilient material having an entire contact surface thereto at least one of welded or adhesively bonded directly to an outer surface of said container body with no spacing between said resealing member and said outer surface, said resilient material being a thermoplastic elastomer, said resealing member being pierceable with the removal device and being able to seal closed a puncture site formed in said container body by the removal device and being formed in a final resealing member shape as a separate member from said container body before being attached to said container body; and
a plastic ring laterally surrounding said resealing member and connected to said outer surface of said container body.

25. A container according to claim 24 wherein
said plastic ring axially engages a radially extending, back surface of a radially projecting edge region of said container body, said back surface facing in a direction away from said outer surface of said container body.

26. A container according to claim 24 wherein
said container body comprises a closure cap having a container head connected to a remaining portion of said container body by a neck part;
said container body comprises a shoulder at a transition between said container head and said remaining portion of said container body; and
said plastic ring overlaps said container head and forms a cap part connected to said shoulder.

27. A container according to claim 26 wherein
said plastic ring forms a cylindrical enclosure for said resealing member, said cylindrical enclosure projecting axially outward from said resealing member.

28. A method of producing a container for a liquid for medical use to be withdrawn from the container with a removal device, comprising the steps of:
providing a container including a container body of plastic and formed and filled with the liquid in an interior of the container body and sealed in a blow molding-fill-seal process, the container body being pierceable by a removal device;
providing a resealing member of a thermoplastic elastomer, the resealing member being previously formed in a final resealing member shape and formed separately from the container and being able to seal close a puncture site formed in the container body by a removal device;
attaching an entire contact surface of the resealing member in the final resealing member shape by at least one of welding or adhesively bonding directly to an outer surface of the container body with no spacing between the resealing member and the outer surface; and forming a plastic ring laterally surrounding the resealing member, and connecting the plastic ring to the outer surface of the container body.

29. A method according to claim 28 wherein the closure cap is molded with a container head connected to the remaining portion of the container body by a neck part;

the container body is molded with a shoulder at a transition between the container head and the remaining portion of the container body; and the plastic ring is mounted to overlap the container head and forms a cap part connected to the shoulder.

\* \* \* \* \*